United States Patent [19]

Bingaman

[11] 3,999,794
[45] Dec. 28, 1976

[54] CROSS-TENSION JAR LIFTER

[76] Inventor: Harold J. Bingaman, 6309 Pentz-Magalia Highway, Paradise, Calif. 95969

[22] Filed: Nov. 7, 1975

[21] Appl. No.: 629,761

[52] U.S. Cl. .................................................. 294/28
[51] Int. Cl.² ........................................ A47J 45/10
[58] Field of Search .......... 294/2, 3, 8.5, 11, 27 R, 294/28–33, 99 R, 106, 118; 81/3.1 R, 3.36, 3.4, 3.44; 215/100 A; 224/45 A, 45 P

[56] References Cited
UNITED STATES PATENTS

| | | | |
|---|---|---|---|
| 61,582 | 1/1867 | Villard | 294/28 |
| 580,268 | 4/1897 | Gartelman | 294/28 X |
| 1,180,552 | 4/1916 | Strawbridge | 81/3.44 |
| 1,298,662 | 4/1919 | Chadwick | 294/27 R X |
| 2,063,805 | 12/1936 | Goetting | 294/28 |
| 3,153,554 | 10/1964 | Beihl | 294/28 |

*Primary Examiner*—Johnny D. Cherry

[57] ABSTRACT

A canning jar lifter with pivoted cross rails having loops at each end which are capable of fitting regular or wide mouth conventional canning jars externally around the neck below the seating rim and by manual operation capable of gripping the jars for lifting and self-adjusting for releasing them.

The embodiment of this invention which is illustrated in the drawings and will be described in more detail hereinafter is shown as comprising a continuous strip of resilient material welded or otherwise firmly affixed end to end. Said material is of a size and so formed as to have a small loop at one end and a large loop at the other end adjoined by rails which are crossed over and pivoted. The rails are flattened in the pivot area and pinned so as to be movable. The loops extend in opposite directions at right angles to the rails. One loop is made so it will fit easily over the neck of a large mouth canning jar. The other loop fits easily over a regular sized canning jar neck. Squeezing the rail ends of the top loop (whichever is up) causes the lower loop to tighten around the jar neck on which it is being used. The loop catches the jar neck just below the seating rim and holds the jar firmly for lifting. Relaxing the pressure on the upper loop rails allows the resilience of the material reinforced by the spring tension in the loops to self-adjust the loop being used back to the original open position. This self-opening of the loops facilitates easy releasing of the held jar. For better gripping and protection to glass jars, the looped ends may be dipped or otherwise coated with a rubberized or suitably pliant material.

1 Claim, 5 Drawing Figures

Fig-5.

U.S. Patent       Dec. 28, 1976       3,999,794
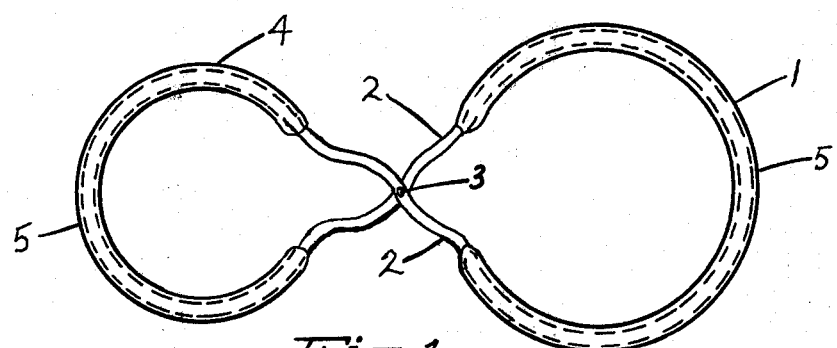
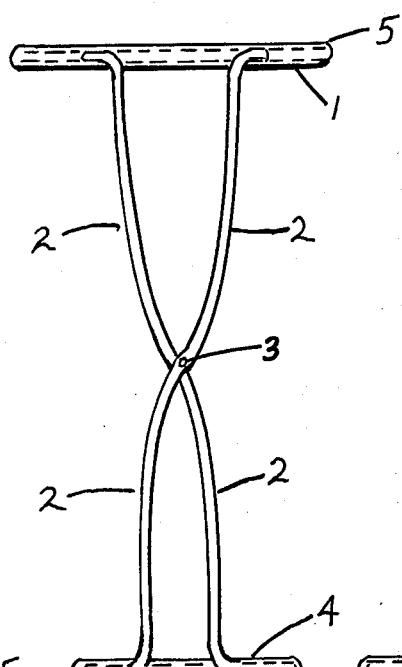
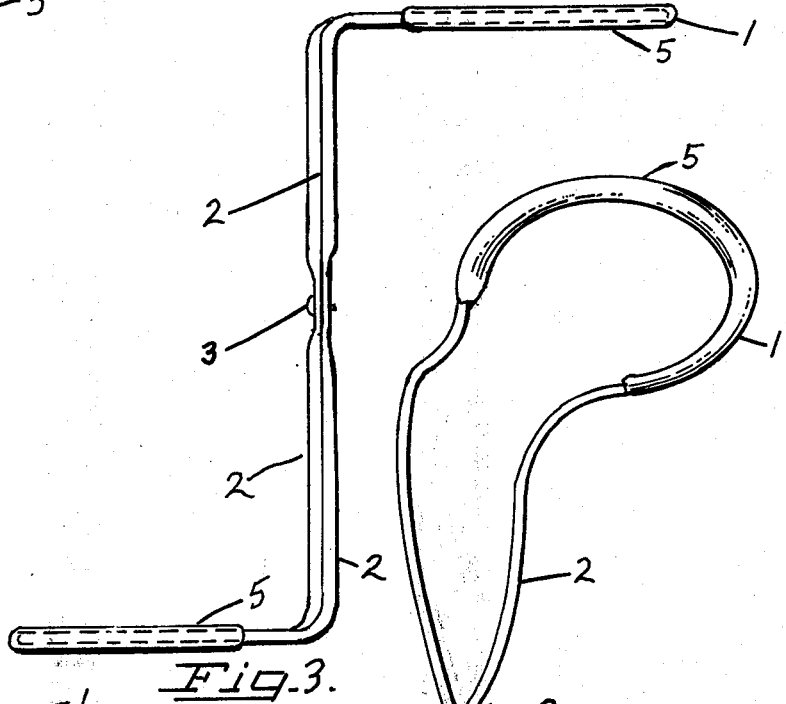
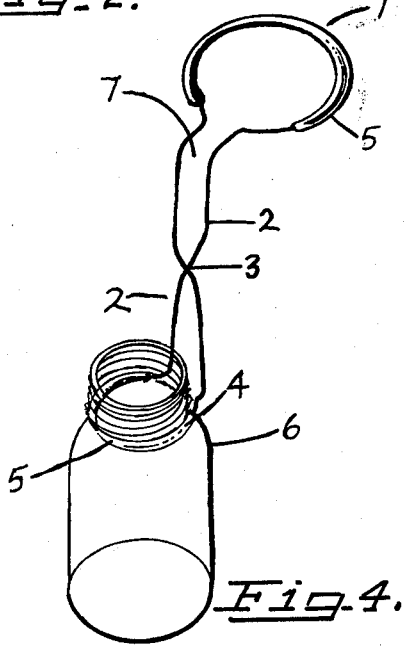
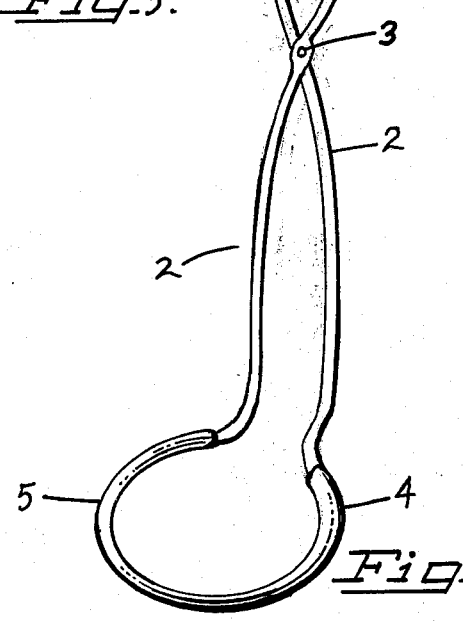

CROSS-TENSION JAR LIFTER

The present invention relates to devices for gripping and lifting conventional canning jars for any reason but is particularly directed towards the removal of quart and pint sized canning jars either wide mouth or regular in design from a hot sterilization bath or a hot cooker.

Many devices in use today as canning jar lifters are not designed for that specific purpose. Some are clumsy to handle because of bulkiness. Others are inefficiently structured and difficult to operate. Even among those marketed as canning jar lifters, there seems need for improvement. The single or double scissor types with wooden handles or finger bars require the use of both hands to operate or that the operator have considerable hand strength. With either of these devices it takes a steady, firm grip to grasp a filled glass canning jar for safe lifting. As these lifters, as well as other, are not designed to completely encircle the jar neck, slipping or turning of the jar in midair can occur and the jar can be easily dropped. When both hands are needed on the handle of a lifter, a real manual effort is required with an element of luck to tip a jar and spill hot sterilization water from it back into the cooker from which the jar was lifted. Devices in use today are so constructed that the operator is neither assisted in picking up a jar nor in releasing it at a desired position. Therefore, the usefulness of conventional canning jar lifters is dependent upon the operator's ability and not on the efficiency of the device.

To overcome the structural difficulties and the operational handicaps encountered in so many currently used jar lifters, the present invention is designed to eliminate these difficulties by offering a simple design in a practical and durable device for grasping and lifting hot canning jars which is self-adjusting and easy to use. The invention is provided with dual loops attached at either end of pivoted rails. The loops are coated with a rubberized material and of a size to fit easily over a wide mouth or a regular sized canning jar neck. Each loop fits completely around the jar neck for which it is sized; and in operation, grips the jar around and under the jar seating rim. This complete encirclement of the jar neck prevents the jar from slipping or tipping during lifting. The rubberized surface of the loops eliminates the metal to glass contact found in most conventional lifters. And the structure of this invention, being of a resilient material, is so arranged that the material reinforced by spring tension in the loops will self-adjust to an open position for assisting the operator to release a jar easily when desired. Only one hand is needed to operate this invention. The top loop (whichever is up) fits comfortably in the palm of the operator's hand leaving the thumb and index finger free for pressurizing or releasing the upper rails as needed to close or open the lower loop. The grippers being complete loops makes this device easy to guide over the neck of a desired jar. When one of the loops is around a jar neck, it is not subject to slipping off whether the operator has activated the gripper or not. Emptying water from a sterilized jar can actually be accomplished with one hand using this invention. For safety, it should be gripped lower down on the upper rails and twisted away from the operator. This lifter is designed especially for lifting hot jars during the home canning process.

The principal object of the invention is to provide a simple structured hot canning jar lifter especially designed for the home canner wherein the jar gripper fits completely around the neck of the jar for safety and the device is self-adjusting to assist the operator in releasing a jar with ease.

A further object of the invention is to provide the home canner with a loop-type lifter so arranged that the lifter without depending upon adjustment by the operator is usable with various sized conventional canning jars.

Another object of the invention is the elimination of metal-to-glass contact by coating the gripper loops with a rubberized or similar pliant material.

A further object of the invention is to provide the home canner with a hot canning jar lifter which is operable with one hand and is braced in the palm of the hand for leverage when lifting and does not require special skill or considerable finger strength when operating.

A still further object of the invention is the safety factor of having the gripper completely loop the jar neck and catch firmly below the jar seating rim so that the jar is securely held and has little chance of twisting, slipping, or falling from the lifter.

Another object of the invention is to provide an uncomplicated item of manufacture allowing a wide choice of materials applicable to its production so that the invention is marketable as an inexpensive item.

Other numerous objects and advantages of the present invention will become apparent upon reading the following specification and referring to the accompanying drawings in which similar characters of reference represent corresponding parts in each of the several views.

In the drawings:

FIG. 1 is a top view of the invention showing a wide mouth loop on top and to the right with the regular loop in the lower position and to the left.

FIG. 2 is a front view in elevation with the large loop at the top and the small loop at the bottom and showing the pivoted rails.

FIG. 3 is a side view in elevation with the lifter positioned the same as in FIG. 2 showing the side of the rails and the flattened pivot point.

FIG. 4 is a pictorial view showing the lifter positioned to grip a regular size canning jar.

FIG. 5 is a pictorial view of the complete lifter.

Referring now more specifically to the drawings, the cross-tension jar lifter characterizing the present invention comprises wide mouth loop 1 being part of a continuous strip of resilient material which extends downward as rails 2 crossing and pivoted at point 3 then continuing downward an equal distance to regular loop 4, both loops being coated with rubberized material 5, loops 1 and 4 extending from rails 2 at right angles in opposite directions.

In operation, loop 1 fits easily over the neck of a wide mouth canning jar and loop 4 fits easily over the neck of a regular canning jar. When loop 4 is being used as illustrated in FIG. 4, loop 1 acts as a holder and a lever, fitting into the palm of the operator's hand and leaving the operator's index finger and thumb in place on rails 2 at position 7. To tighten loop 4, the operator squeezes the upper rails 2 at point 7 exerting pressure through pivot 3 to close loop 4 around the neck of jar 6 seating rubberized material 5 against the glass below the rim of jar 6 as loop 4 tightens from the transmitted pressure at point 7. The lifter works inversely in the same manner. When pressure is released at point 7, the resilient material in the lifter reinforced by spring tension in loop 1 and loop 4 acting conjointly opens loop 4 and releases jar 6.

Although the present invention has been described and illustrated in some detail herein, it is understood that certain changes and modifications may be made within the spirit of the invention as limited by the scope of the appended claims.

I claim:

1. A cross-tension jar lifter comprising: two rails crossed and pivoted, the ends of which are formed into two loops, one loop of larger size is at the top of the rails and a smaller size loop is at the bottom of the rails with said loops extending in opposite directions at right angles to the rails to form a Z-like structure when viewed from the side in a vertical position, wherein the lifter is designed in one-piece form utilizing cross tension from the structural arrangement and from resilience in the material of manufacture to self-adjust in maintaining an original shape as part of the utility of the lifter, said lifter consisting of two completely looped grippers coated with a pliant material, one loop formed to fit easily over the neck of a conventional large mouth canning jar and the other loop fitting easily over the neck of a regular size conventional canning jar, said loops and rails being adjoining sections of a single material manufactured or so affixed as to be a continuous frame with said lifter being inversely operational, the operating of the lifter consisting of holding one loop in the palm of the hand as a handle and a lever to manipulate through pressure on the rails the tightening for lifting and the loosening for releasing the other loop when it is being used around a canning jar neck.

* * * * *